(12) United States Patent
Lee et al.

(10) Patent No.: US 10,216,041 B2
(45) Date of Patent: Feb. 26, 2019

(54) OPTICAL FILM, MANUFACTURING METHOD THEREOF AND DISPLAY DEVICE

(71) Applicant: SAMSUNG ELECTRONICS CO., LTD., Suwon-si, Gyeonggi-do (KR)

(72) Inventors: Seunghyun Lee, Yongin-si (KR); Ju Hyun Kim, Anyang-si (KR); Hyunseok Choi, Anyang-si (KR); Beom Seok Kim, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 415 days.

(21) Appl. No.: 15/069,042

(22) Filed: Mar. 14, 2016

(65) Prior Publication Data

US 2017/0075171 A1    Mar. 16, 2017

(30) Foreign Application Priority Data

Sep. 16, 2015    (KR) ........................ 10-2015-0131158

(51) Int. Cl.
*G02F 1/13363* (2006.01)
*G02F 1/1337* (2006.01)
*G02B 5/30* (2006.01)
*G02F 1/1335* (2006.01)

(52) U.S. Cl.
CPC ...... *G02F 1/133711* (2013.01); *G02B 5/3016* (2013.01); *G02B 5/3041* (2013.01); *G02F 1/13363* (2013.01); *G02F 1/133788* (2013.01); *G02F 1/133528* (2013.01); *G02F 2001/133633* (2013.01); *G02F 2001/133635* (2013.01); *G02F 2001/133742* (2013.01)

(58) Field of Classification Search
CPC .... G02B 5/3016; G02B 5/3041; G02B 5/305; G02F 1/133528; G02F 1/133788; G02F 1/133711; G02F 2001/133742; G02F 1/13363; G02F 2001/133633; G02F 2001/133635

USPC ....... 430/321; 349/124, 96, 117; 359/487.02
See application file for complete search history.

(56) References Cited

U.S. PATENT DOCUMENTS

| 7,764,338 B2 | 7/2010 | Kitamura et al. |
| 7,771,802 B2 | 8/2010 | Nakayama |
| 2007/0058118 A1 | 3/2007 | Cirkel et al. |

(Continued)

FOREIGN PATENT DOCUMENTS

| EP | 2730954 A1 | 5/2014 |
| KR | 100706691 | 4/2007 |

(Continued)

OTHER PUBLICATIONS

Extended European Search Report dated Feb. 20, 2017 of the corresponding European Patent Application No. 16164832.4.

*Primary Examiner* — John A McPherson
(74) *Attorney, Agent, or Firm* — Cantor Colburn LLP

(57) ABSTRACT

An optical film includes a polarizing film including a polyolefin and a dichroic dye, a first photo-alignment layer on a side of the polarizing film, and a first liquid crystal layer on a side of the first photo-alignment layer, wherein the polarizing film and the first liquid crystal layer are in close contact with the first photo-alignment layer to provide a self-integrated structure. A method of manufacturing the same and a display device including the optical film are also provided.

5 Claims, 8 Drawing Sheets

(56) References Cited

U.S. PATENT DOCUMENTS

| | | | |
|---|---|---|---|
| 2008/0225210 A1* | 9/2008 | Shimoda | G02B 5/3033 349/96 |
| 2009/0103030 A1 | 4/2009 | Yoon et al. | |
| 2009/0180059 A1* | 7/2009 | Fukuda | B32B 23/08 349/96 |
| 2010/0053520 A1 | 3/2010 | Yoon et al. | |
| 2011/0001906 A1 | 1/2011 | Chang et al. | |
| 2011/0129598 A1 | 6/2011 | Yoon et al. | |
| 2012/0050652 A1 | 3/2012 | Chang et al. | |
| 2013/0303677 A1 | 11/2013 | Kim et al. | |
| 2014/0131643 A1 | 5/2014 | Lee et al. | |
| 2014/0254012 A1 | 9/2014 | Moon et al. | |
| 2015/0029143 A1 | 1/2015 | Kang et al. | |
| 2015/0160388 A1 | 6/2015 | Kobayashi | |
| 2016/0109757 A1* | 4/2016 | Ibaraki | G02F 1/133634 349/75 |

FOREIGN PATENT DOCUMENTS

| | | |
|---|---|---|
| KR | 1020070089078 | 8/2007 |
| KR | 1020090101620 | 9/2009 |

* cited by examiner

OPTICAL FILM, MANUFACTURING METHOD THEREOF AND DISPLAY DEVICE

CROSS-REFERENCE TO RELATED APPLICATIONS

This application claims priority to and the benefit of Korean Patent Application No. 10-2015-0131158 filed in the Korean Intellectual Property Office on Sep. 16, 2015, and all the benefits accruing therefrom under 35 U.S.C. §119, the entire contents of which are incorporated herein by reference.

BACKGROUND

1. Field

An optical film, a manufacturing method thereof, and a display device are disclosed.

2. Description of the Related Art

Commonly used flat panel displays may be classified into a light-emitting display device emitting light by itself and a non-emissive display device requiring a separate light source. An optical film such as a compensation film is frequently employed for improving the image quality thereof.

In the case of the light emitting display device, for example, an organic light emitting display device, the visibility and the contrast ratio may be deteriorated by reflection of external light caused by a metal such as an electrode.

In the case of the light-receiving display device, for example, a liquid crystal display (LCD), the image quality may be deteriorated by the reflection of external light and a sunglass effect according to the device kind such as transparent, transflective, reflective, and so on.

As a solution, an optical film may be used for the flat panel display. However, known optical films are thick and thus hinder manufacture of a thin display device. In addition, the optical films are not readily applied to a flexible display device due to thickness and optical durability.

SUMMARY

One embodiment provides an optical film applicable to a flexible display device.

Another embodiment provides a method of manufacturing the optical film.

Yet another embodiment provides a display device including the optical film.

According to an embodiment, an optical film includes a polarizing film including a polyolefin and a dichroic dye, a first photo-alignment layer on a side of the polarizing film, and a first liquid crystal layer on a side of the first photo-alignment layer, wherein the polarizing film and the first liquid crystal layer are adjacent to the first photo-alignment layer to provide a self-integrated structure.

A display device includes the above described optical film.

A method of manufacturing an optical film includes preparing a polarizing film from a melt-blend of a polyolefin and a dichroic dye, coating a solution for a photo-alignment layer including a photoreactive compound and a solvent on a side of the polarizing film to prepare a coated solution, drying the coated solution for a photo-alignment layer to provide a first photo-alignment layer, and forming a first liquid crystal layer on a side of the first photo-alignment layer, wherein solubility parameters of the polyolefin and the solvent satisfy Relationship Equations 1 to 3.

$0.9 \leq |H_D(P)-H_D(S)| \leq 1.7$,      Relationship Equation 1

$1.9 \leq |H_P(P)-H_P(S)| \leq 4.1$,      Relationship Equation 2

$4.9 \leq |H_H(P)-H_H(S)| \leq 10.8$.      Relationship Equation 3

In Relationship Equations 1 to 3, $H_D(P)$ is a Hansen solubility parameter for a repulsive force or a dispersion of the polyolefin, $H_D(S)$ is a Hansen solubility parameter for a repulsive force or a dispersion of the solvent, $H_P(P)$ is a Hansen solubility parameter for a polarity of the polyolefin, $H_P(S)$ is a Hansen solubility parameter for a polarity of the solvent, $H_H(P)$ is a Hansen solubility parameter for a hydrogen bond of the polyolefin, and $H_H(S)$ is a Hansen solubility parameter for a hydrogen bond of the solvent. The first photo-alignment layer includes a reaction product of a photoreactive compound and a solvent, wherein the reaction product of the photoreactive compound is aligned in a predetermined direction with regard to the surface of the polarizing film, and solubility parameters of the polyolefin and the solvent satisfy Relationship Equations 1 to 3.

$0.9 \leq |H_D(P)-H_D(S)| \leq 1.7$      Relationship Equation 1

$1.9 \leq |H_P(P)-H_P(S)| \leq 4.1$      Relationship Equation 2

$4.9 \leq |H_H(P)-H_H(S)| \leq 10.8$      Relationship Equation 3

In Relationship Equations 1 to 3, $H_D(P)$ is a Hansen solubility parameter for a repulsive force or dispersion of the polyolefin, $H_D(S)$ is a Hansen solubility parameter for a repulsive force or dispersion of the solvent, $H_P(P)$ is a Hansen solubility parameter for a polarity of the polyolefin, $H_P(S)$ is a Hansen solubility parameter for a polarity of the solvent, $H_H(P)$ is a Hansen solubility parameter for a hydrogen bond of the polyolefin, and $H_H(S)$ is a Hansen solubility parameter for a hydrogen bond of the solvent.

The polyolefin may include polypropylene, and the solvent may include propylene glycol monomethyl ether, a mixed solvent of propylene glycol monomethyl ether and toluene, a mixed solvent of propylene glycol monomethyl ether and cyclohexanone.

The optical film includes no adhesive between the polarizing film and the first photo-alignment layer and between the first photo-alignment layer and the first liquid crystal layer.

The first liquid crystal layer may be a phase delay layer.

The optical film may be a flexible film having flexibility of a curvature radius of about 1 millimeters (mm) to about 10 mm.

The optical film may have a thickness of less than or equal to about 50 micrometers (μm).

The optical film may further include an auxiliary layer on a side of the polarizing film opposite the side adjacent to the first photo alignment layer or on a side of the first liquid crystal layer.

The auxiliary layer may include a homeotropic liquid crystal.

The optical film may further include a second photo-alignment layer on a side of the first liquid crystal layer and a second liquid crystal layer on a side of the second photo-alignment layer, wherein any layer which is on another layer is adjacent to it, to provide a self-integrated structure.

The second photo-alignment layer may include a reaction product of a photoreactive compound and a solvent, and the reaction product of the photoreactive compound may be aligned in a predetermined direction with regard to the surface of the first liquid crystal layer.

The first liquid crystal layer and the second liquid crystal layer may be phase delay layers, and the first liquid crystal layer and the second liquid crystal layer may have a different phase delay.

One of the first liquid crystal layer and the second liquid crystal layer may have an in-plane retardation of about 230 nanometers (nm) to about 300 nm at a 550 nm wavelength, and the other of the first liquid crystal layer and the second liquid crystal layer may have an in-plane retardation of about 110 nm to about 160 nm at a 550 nm wavelength.

The optical film may further include an auxiliary layer on a side of the polarizing film opposite the side adjacent to the first photo alignment layer or on a side of the second liquid crystal layer.

The auxiliary layer may include a homeotropic liquid crystal.

According to another embodiment, a display device including the optical film is provided.

According to another embodiment, a method of manufacturing an optical film includes preparing a polarizing film from a melt-blend of a polyolefin and a dichroic, coating a solution for a photo-alignment layer including a photoreactive compound and a solvent on a side of the polarizing film to prepare a coated solution, drying the coated solution for a photo-alignment layer to provide a first photo-alignment layer, and forming a first liquid crystal layer on a side of the first photo-alignment layer, wherein solubility parameters of the polyolefin and the solvent satisfy Relationship Equations 1 to 3.

$$0.9 \leq |H_D(P) - H_D(S)| \leq 1.7, \quad \text{Relationship Equation 1}$$

$$1.9 \leq |H_P(P) - H_P(S)| \leq 4.1, \quad \text{Relationship Equation 2}$$

$$4.9 \leq |H_H(P) - H_H(S)| \leq 10.8. \quad \text{Relationship Equation 3}$$

In Relationship Equations 1 to 3, $H_D(P)$ is a Hansen solubility parameter for a repulsive force or a dispersion of the polyolefin, $H_D(S)$ is a Hansen solubility parameter for a repulsive force or a dispersion of the solvent, $H_P(P)$ is a Hansen solubility parameter for a polarity of the polyolefin, $H_P(S)$ is a Hansen solubility parameter for a polarity of the solvent, $H_H(P)$ is a Hansen solubility parameter for a hydrogen bond of the polyolefin, and $H_H(S)$ is a Hansen solubility parameter for a hydrogen bond of the solvent.

The coated solution for a photo-alignment layer may be dried at about 25 to about 100° C.

The photoreactive compound may include a photo-dimerized compound.

The polyolefin may include polypropylene, and the solvent may include propylene glycol monomethyl ether, a mixed solvent of propylene glycol monomethyl ether and toluene, a mixed solvent of propylene glycol monomethyl ether and cyclohexanone.

The method may further include forming a second photo-alignment layer on a side of the first liquid crystal layer and forming a second liquid crystal layer on a side of the second photo-alignment layer.

The method may further include forming an auxiliary layer on a side of the polarizing film opposite the side adjacent to the first photo alignment layer or on a side of the first liquid crystal layer.

DETAILED DESCRIPTION

Figure 1:
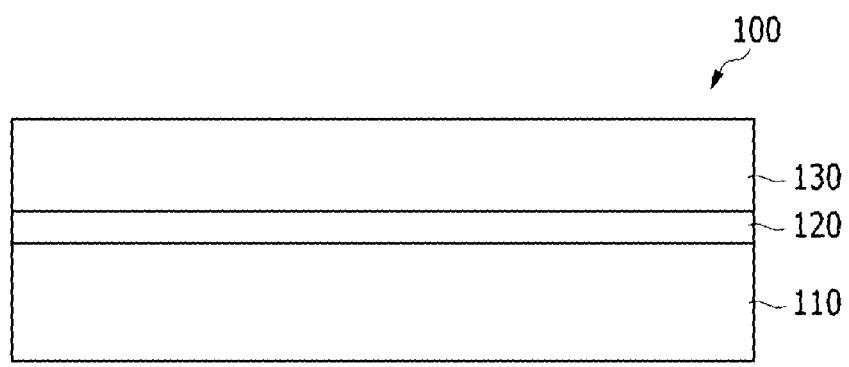
FIG. 1 is a schematic cross-sectional view showing an optical film according to one embodiment.

Exemplary embodiments will hereinafter be described in detail, and may be easily performed by those who have common knowledge in the related art. However, this disclosure may be embodied in many different forms and is not construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, two layers are "adjacent" if they are either in direct contact with no intervening layers, or if they are separated only by an intervening layer that is not an adhesive layer.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region,"

"layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an optical film according to an embodiment is described referring to drawings.

Figure 2:
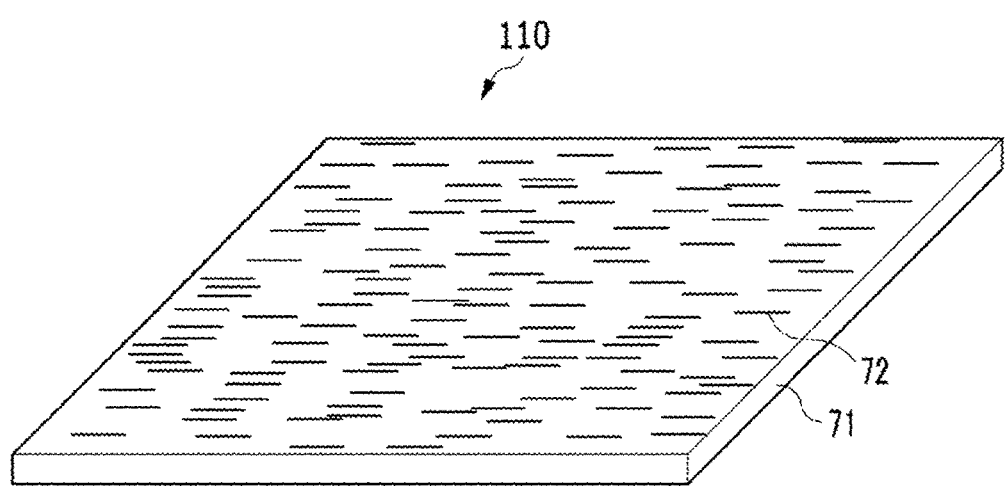
FIG. 2 is a schematic plan view showing a polarizing film of the optical film in FIG. 1.

FIG. 1 is a schematic cross-sectional view showing an optical film according to one embodiment, and FIG. 2 is a schematic plan view of a polarizing film of the optical film in FIG. 1.

Referring to FIG. 1, an optical film 100 according to an embodiment includes a polarizing film 110, a first photo-alignment layer 120, and a first liquid crystal layer 130.

Referring to FIG. 2, the polarizing film 110 may be a self-integrated elongated film made of a melt-blend of a polyolefin 71 and a dichroic dye 72.

The polyolefin 71 may be for example polyethylene (PE), polypropylene (PP), a polyethylene-polypropylene copolymer (PE-PP), or a mixture thereof. The polypropylene (PP) may have a melt flow index (MFI) of for example about 0.1 g/10 min to about 5 g/10 min. Herein, the melt flow index (MFI) shows the amount of a polymer in a melt state flowing per 10 minutes, and relates to viscosity of the polymer in a melted state. In other words, as the melt flow index (MFI) is lower, the polymer has higher viscosity, while as the melt flow index (MFI) is higher, the polymer has lower viscosity. When the polypropylene (PP) has a melt flow index (MFI) within the above disclosed range, properties of a final product as well as workability may be effectively improved. Specifically, the polypropylene may have a melt flow index (MFI) ranging from about 0.5 g/10 min to about 5 g/10 min.

The polyethylene-polypropylene copolymer (PE-PP) may include about 1 weight percent (wt %) to about 50 wt % of an ethylene group based on the total amount of the copolymer. When the polyethylene-polypropylene copolymer (PE-PP) includes the ethylene group within this range, phase separation of the polypropylene and the polyethylene-polypropylene copolymer (PE-PP) may be effectively prevented or suppressed. In addition, the polyethylene-polypropylene copolymer (PE-PP) may improve an elongation rate during elongation as well as have excellent light transmittance and alignment, improving polarization characteristics. Specifically, the polyethylene-polypropylene copolymer (PE-PP) may include an ethylene group in an amount of about 1 wt % to about 25 wt % based on the total amount of the copolymer.

The polyethylene-polypropylene copolymer (PE-PP) may have a melt flow index (MFI) ranging from about 5 g/10 min to about 15 g/10 min. When the polyethylene-polypropylene copolymer (PE-PP) has a melt flow index (MFI) within this range, properties of a final product as well as workability may be effectively improved. Specifically, the polyethylene-polypropylene copolymer (PE-PP) may have a melt flow index (MFI) ranging from about 10 g/10 min to about 15 g/10 min.

The polyolefin 71 may have haze ranging from less than or equal to about 5%. When the polyolefin 71 has haze within this range, transmittance may be increased, and thus excellent optical properties may be secured. Specifically, the polyolefin 71 may have haze of less than or equal to about 2%, and more specifically, about 0.5% to about 2%.

The polyolefin 71 may have crystallinity of less than or equal to about 50%. When the polyolefin 71 has crystallinity within this range, the polyolefin 71 may have lower haze and excellent optical properties. Specifically, the polyolefin 71 may have crystallinity of about 30% to about 50%.

The polyolefin 71 may have transmittance of greater than or equal to about 85% in a wavelength region of about 400 nm to about 780 nm. The polyolefin 71 may be elongated in a uniaxial direction. The uniaxial direction may be the length (i.e., the aligned) direction of the dichroic dye 72.

The dichroic dye 72 is dispersed into the polyolefin 71 and aligned in the elongation direction of the polyolefin 71. The dichroic dye 72 is a material that transmits one perpendicular polarization component of two perpendicular polarization components in a predetermined wavelength region.

The dichroic dye 72 may be included in an amount of about 0.01 to about 5 parts by weight based on 100 parts by weight of the polyolefin 71. When the dichroic dye is included within this range, sufficient polarization characteristics may be obtained without deteriorating transmittance of a polarizing film. Within the above range, the dichroic dye 72 may be included in an amount of about 0.05 to about 1 part by weight based on 100 parts by weight of the polyolefin 71.

The polarizing film 110 may have a dichroic ratio of about 2 to about 14 in a maximum absorption wavelength ($\Delta_{max}$) of a visible ray region. Within the range, the dichroic ratio may be about 3 to about 10. Herein, the dichroic ratio may be calculated by dividing plane polarization absorbance in a perpendicular direction to the axis of a polymer by polarization absorbance in a horizontal direction according to Equation 1.

$$DR = \text{Log}(1/T_\perp)/\text{Log}(1/T_{//}) \qquad \text{Equation 1}$$

In Equation 1,

DR denotes a dichroic ratio of a polarizing film, $T_{||}$ is light transmittance of light entering parallel to the transmissive axis of a polarizing film, and $T_\perp$ is light transmittance of light entering perpendicular to the transmissive axis of the polarizing film.

The dichroic ratio shows to what degree the dichroic dye 72 is arranged in the polarizing film 110 in one direction. When the polarizing film 110 has a dichroic ratio within the range in the visible ray wavelength region, the dichroic dye 72 is arranged according to arrangement of polymer chains, improving polarization characteristics of the polarizing film 110.

The polarizing film 110 may have polarization efficiency of greater than or equal to about 80%, and specifically, ranging from about 83% to about 99.9% within this range. Herein, the polarization efficiency may be obtained by Equation 2.

$$PE(\%) = [(T_{//} - T_\perp)/(T_{//} + T_\perp)]^{1/2} \times 100 \qquad \text{Equation 2}$$

In Equation 2,

PE denotes polarization efficiency, $T_{||}$ is transmittance of light entering parallel to the transmissive axis of a polarizing film, and $T_\perp$ is transmittance of light entering perpendicular to the transmissive axis of the polarizing film.

The polarizing film 110 may have a relatively thin thickness of less than or equal to about 50 μm, for example about 10 μm to about 50 μm. When the polarizing film 110 has a thickness within this range, it may be significantly thinner than a polarizing plate requiring a protective layer such as triacetyl cellulose (TAC) and contribute to realizing a thin display device.

The first photo-alignment layer 120 is a thin film having an alignment in a predetermined direction by radiating light and may include, for example, a reaction product by cross-linking, polymerization, dimerization of a photoreactive compound, and/or the like. The photoreactive compound may have for example at least one photoreactive functional group and at least one cross-linking functional group. For example, the photoreactive compound may be a photo-dimerized compound.

The photoreactive functional group may be for example a cinnamate functional group represented by Chemical Formula D, a chalcone functional group represented by Chemical Formula E, or a coumarin functional group represented by Chemical Formula F, but is not limited thereto.

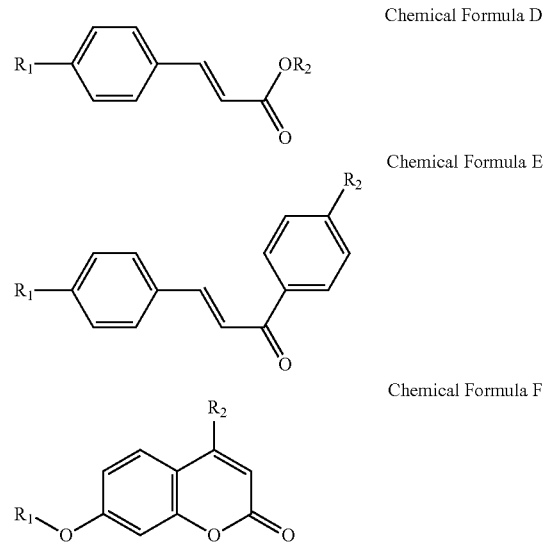

Chemical Formula D

Chemical Formula E

Chemical Formula F

In Chemical Formulae D to F, $R_1$ is a hydrogen atom, a halogen atom, a substituted or unsubstituted C1 to C3 alkyl group, a substituted or unsubstituted C1-C3 alkoxy group or cyano group, and $R_2$ is a substituted or unsubstituted phenyl group, a substituted or unsubstituted biphenyl group, a substituted or unsubstituted terphenyl group or a substituted or unsubstituted cyclohexyl group.

The first photo-alignment layer 120 may provide a pretilt angle to liquid crystals of the first liquid crystal layer 130 which is described below and may align the liquid crystals in a predetermined direction. For example, the reaction product of the photoreactive compound may be aligned in a predetermined direction with regard to the surface of the polarizing film 110 and the liquid crystals of the first liquid crystal layer 130 may be aligned according to the aligned direction of the reaction product of the photoreactive compound of the first photo-alignment layer 120. Herein, the predetermined direction may be greater than 0° and less than 180° with regard to the surface of the polarizing film 110. For example, when the polarized ultraviolet radiation (UV) is used to provide an alignment property to the first photo-alignment layer 120, the predetermined direction may be substantially horizontal direction or substantially vertical direction with regard to the radiated polarization direction.

The first photo-alignment layer 120 may be coated directly on the polarizing film 110, and accordingly, the polarizing film 110 and the first photo-alignment layer 120 may be adjacent to each other without an intervening adhesive.

The first photo-alignment layer 120 may be formed by coating for example a solution for a photo-alignment layer including a photoreactive compound and a solvent on one side of the polarizing film 110 and drying it.

The solvent may be selected from solvents dissolving the photoreactive compound, for example, toluene, cyclohexanone, cyclopentanone, n-butyl acetate, or propylene glycol methyl ether and also, a mixed solvent of more than two selected therefrom. In addition, the solvent may include any solvent capable of effectively dissolving each component to obtain a solution coated on a substrate.

Herein, the coating property of the first photo-alignment layer 120 may be determined by interactions between the polarizing film 110 and the solution for a photo-alignment layer and specifically, between polyolefin 71 included in the polarizing film 110 and a solvent included in the solution for a photo-alignment layer.

The interactions between polyolefin 71 included in the polarizing film 110 and the solvent included in the solution for a photo-alignment layer may be represented as a solubility parameter. The solubility parameter indicates interactions among compounds, and herein as the solubility parameter among compounds is smaller, the interactions are larger, while the solubility parameter is larger, the interactions are smaller.

The solubility parameter may be, for example represented as a Hansen solubility parameter. The Hansen solubility parameter may indicate interactions involving a repulsive force (dispersion), polarity, and hydrogen bonding among compounds.

For example, the polyolefin 71 and the solvent included in the solution for a photo-alignment layer may satisfy solubility parameters of Relationship Equations 1 to 3.

$$0.9 \leq |H_D(P) - H_D(S)| \leq 1.7, \qquad \text{Relationship Equation 1}$$

$$1.9 \leq |H_P(P) - H_P(S)| \leq 4.1, \qquad \text{Relationship Equation 2}$$

$$4.9 \leq |H_H(P) - H_H(S)| \leq 10.8. \qquad \text{Relationship Equation 3}$$

In Relationship Equations 1 to 3, $H_D(P)$ indicates a Hansen solubility parameter for a repulsive force or a dispersion of the polyolefin, $H_D(S)$ indicates a Hansen solubility parameter for a repulsive force or a dispersion of the solvent, $H_P(P)$ indicates a Hansen solubility parameter for a polarity of the polyolefin, $H_P(S)$ indicates a Hansen solubility parameter for a polarity of the solvent, $H_H(P)$ indicates a Hansen solubility parameter for a hydrogen bond of the polyolefin, and $H_H(S)$ indicates a Hansen solubility parameter for a hydrogen bond of the solvent.

The first solution for a photo-alignment layer satisfying the solubility parameters of Relationship Equations 1 to 3 may be well coated on the polarizing film 110 without dewetting and make the polarizing film 110 adjacent to the first photo-alignment layer 120.

For example, the polyolefin 71 may include polypropylene, and the solvent may include propylene glycol monomethyl ether, a mixed solvent of propylene glycol monomethyl ether and toluene, a mixed solvent of propylene glycol monomethyl ether and cyclohexanone, but is not limited thereto.

The first photo-alignment layer 120 may be less than or equal to about 500 nm thick, for example, about 5 nm to about 300 nm thick within the range, and specifically, about 10 nm to about 200 nm thick within the range.

The first liquid crystal layer 130 may include at least one liquid crystal.

The liquid crystal may have a shape such as a rigid rod shape or a wide disk shape, and may be, for example, a monomer, an oligomer, and/or a polymer. The liquid crystal may, for example, have a positive or negative birefringence. The liquid crystal may be aligned in one direction along the optical axis.

The liquid crystal may be a reactive mesogenic liquid crystal and may have, for example, at least one reactive cross-linkable group. The reactive mesogenic liquid crystal may include at least one of, for example, a rod-shaped aromatic derivative having at least one reactive cross-linking group, propylene glycol 1-methyl, propylene glycol 2-acetate, and a compound represented by $P^1$-$A^1$-$(Z^1$-$A^2)n$-$P^2$ (wherein $P^1$ and $P^2$ independently include acrylate, methacrylate, vinyl, vinyloxy, epoxy, or a combination thereof, $A^1$ and $A^2$ independently include 1,4-phenylene, naphthalene-2,6-diyl group, or a combination thereof, $Z^1$ includes a single bond, —C(O)O—, —OC(O)—, —(O)CO— or a combination thereof, and n is 0, 1, or 2), but is not limited thereto.

For example, the first liquid crystal layer 130 may be a phase delay layer.

The phase delay may be represented by an in-plane retardation ($R_e$) and the in-plane retardation ($R_e$) may be represented by $R_e = (n_x - n_y)d$. Herein, $n_x$ is a refractive index in a direction having a highest refractive index in a plane of the first liquid crystal layer 130 (hereinafter referred to as "slow axis"), $n_y$ is a refractive index in a direction having a lowest refractive index in a plane of the first liquid crystal layer 130 (hereinafter referred to as "fast axis"), and d is a thickness of the first liquid crystal layer 130.

The first liquid crystal layer 130 may have an in-plane retardation within a predetermined range by adjusting a refractive index and/or a thickness in the slow axis and/or the fast axis of the first liquid crystal layer 130. According to and embodiment, the first liquid crystal layer 130 may have an in-plane retardation ($R_e$) at a wavelength of 550 nm (hereinafter, referred to as a 'reference wavelength') in a range of about 110 nm to 160 nm, and may be for example, a λ/4 plate. Herein, the first liquid crystal layer 130 may circularly polarize light passing the polarizing film 110 and thus generate a retardation and have an influence on reflection and/or absorption of the light.

On the other hand, the retardation may be a thickness retardation ($R_{th}$) in addition to the in-plane retardation ($R_e$). The thickness retardation ($R_{th}$) is generated in the thickness direction of the first liquid crystal layer 130 and may be represented as $R_{th} = \{[(n_x + n_y)/2] - n_z\}d$. Herein, $n_x$ is a refractive index in the slow axis of the first liquid crystal layer 130, $n_y$ is a refractive index in the fast axis of the first liquid crystal layer 130, and $n_z$ is a refractive index in a perpendicular direction to the $n_x$ and $n_y$. For example, the thickness retardation ($R_{th}$) of the first liquid crystal layer 130 at a reference wavelength may be in a range of about −250 nm to about 250 nm.

The first liquid crystal layer 130 may be an anisotropic liquid crystal layer and have a positive or negative birefringence.

The first liquid crystal layer 130 may have, for example, a refractive index satisfying one of Relationship Equations 4 to 6.

$$n_x > n_y = n_z, \qquad \text{Relationship Equation 4}$$

$$n_x < n_y = n_z, \qquad \text{Relationship Equation 5}$$

$$n_x > n_z > n_y, \qquad \text{Relationship Equation 6}$$

In Relationship Equations 4 to 6, $n_x$ is a refractive index in the slow axis of the first liquid crystal layer 130, $n_y$ is a refractive index in the fast axis of first liquid crystal layer 130, and $n_z$ is a refractive index in a perpendicular direction to the $n_x$ and $n_y$.

For example, the first liquid crystal layer 130 may be a protective layer for the polarizing film 110.

The first liquid crystal layer 130 may protect the surface of the polarizing film 110 and simultaneously, prevent the dichroic dye 72 included in the polarizing film 110 from migrating toward another layer, for example, at a high temperature under high humidity. Accordingly, an optical film may be prevented from degradation of optical properties at the same high temperature under the same high humidity.

The first liquid crystal layer 130 may be coated on the first photo-alignment layer 120.

The first liquid crystal layer 130 may be less than or equal to about 10 μm thick. Within the range, the first liquid crystal layer 130 may be about 1 μm to about 10 μm thick and specifically, about 1 μm to about 5 μm thick.

The optical film 100 may be disposed on one side or both sides of a display device and particularly, on the screen side of the display device and thus prevent reflection of light inflowing from outside (hereinafter, referred to be 'external light'). Accordingly, visibility deterioration due to reflection of the external light may be prevented.

Figure 3:
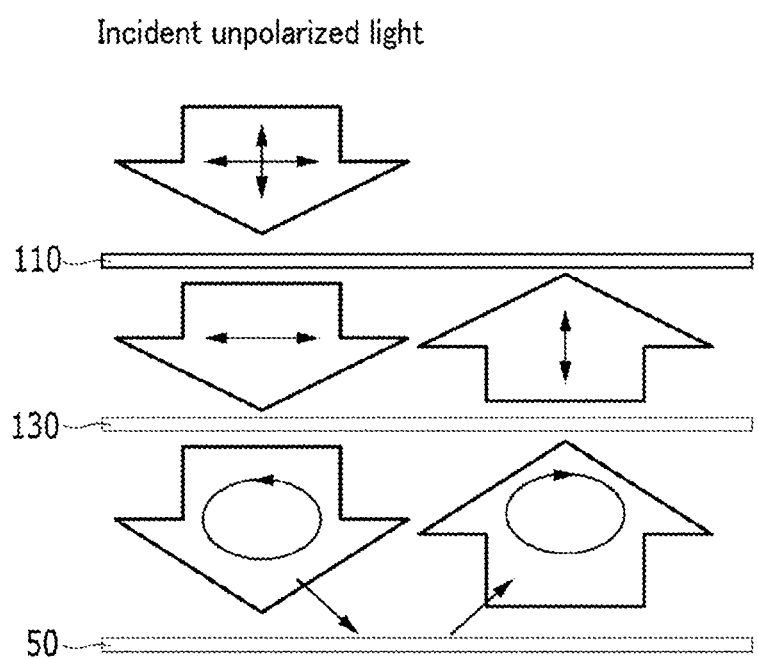
FIG. 3 is a schematic view showing the external light anti-reflection principle of an optical film according to one embodiment.

FIG. 3 is a schematic view showing the anti-refractive principle of optical film.

Referring to FIG. 3, while the incident unpolarized light having entered from the outside is passed through the polarizing film 110, and the polarized light is shifted into circularly polarized light by passing through the first liquid crystal layer 130, only a first polarized perpendicular component, which is one polarized perpendicular component of two polarized perpendicular components, is transmitted. While the circularly polarized light is reflected in a display panel 50 including a substrate, an electrode, and so on, and changes the circular polarization direction, and the circularly polarized light is passed through the first liquid crystal layer 130 again, only a second polarized perpendicular component, which is the other polarized perpendicular component of the two polarized perpendicular components, may be transmitted. As the second polarized perpendicular component is not passed through the polarizing film 110, and light does not exit to the outside, effects of preventing the external light reflection may be provided.

As described above, the polarizing film 110, the first photo-alignment layer 120, and the first liquid crystal layer 130 may be adjacent to each other through coating and thus have a self-integrated structure without a separate adhesive. Accordingly, the optical film 100 may have a reduced thickness, for example, a thickness of less than or equal to about 50 μm and specifically, a thickness of less than or equal to about 35 μm. For example, the optical film 100 may have a thickness of about 10 to about 35 μm.

The optical film 100 has a thin thickness as aforementioned and thus may be applied to a flexible display device such as a foldable display device or a bendable display device. For example, the optical film 100 may be a flexible film having the flexibility of a curvature radius of less than or equal to about 10 mm. Herein, the flexibility of a curvature radius of less than or equal to about 10 mm may refer to, when a static bending test is performed by folding a film to have a curvature radius of less than or equal to 10 mm and then, allowing it to stand at room temperature for 240 hours, and unfolding it, there is no substantial change or deterioration at the folding portion. For example, the optical film 100 may be a flexible film having the flexibility of a curvature radius of less than or equal to about 9 mm, for example, less than or equal to about 8 mm, for example, less than or equal to about 7 mm, for example, less than or equal to about 6 mm, for example, less than or equal to about 5 mm, for example, less than or equal to about 4 mm, for example, less than or equal to about 3 mm, for example, less than or equal to about 2 mm, or for example, less than or equal to about 1 mm. For example, the optical film 100 may be a flexible film having the flexibility of a curvature radius ranging from about 1 nm to about 10 nm, for example, ranging from about 1 nm to about 9 nm, for example, ranging from about 1 nm to about 8 nm, for example, ranging from about 1 nm to about 7 nm, for example, ranging from about 1 nm to about 6 nm, for example, ranging from about 1 nm to about 5 nm, for example, ranging from about 1 nm to about 4 nm, for example, ranging from about 1 nm to about 3 nm, or for example, or ranging from about 1 nm to about 2 nm.

Hereinafter, an optical film according to another embodiment is illustrated.

Figure 4:
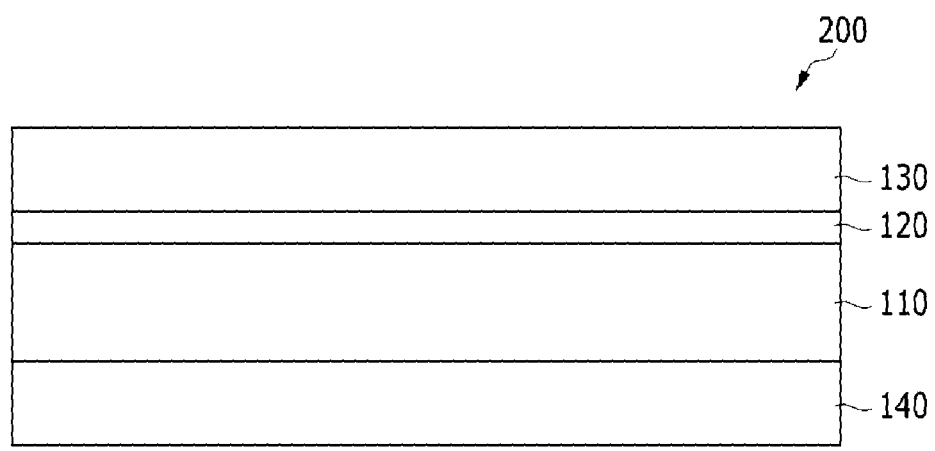
FIG. 4 is a schematic cross-sectional view showing an optical film according to another embodiment.

FIG. 4 is a schematic cross-sectional view showing an optical film according to another embodiment.

Referring to FIG. 4, the optical film 200 according to the present embodiment includes the polarizing film 110, the first photo-alignment layer 120, and the first liquid crystal layer 130, like the above embodiment.

However, the optical film 200 according to the present embodiment may further include an auxiliary layer 140, unlike the above embodiment. In the drawing, the auxiliary layer 140 is positioned on one side of the polarizing film 110 for better understanding and ease of description but is not limited thereto and may be positioned on one side of the first liquid crystal layer 130.

For example, the auxiliary layer 140 is combined with the first liquid crystal layer 130 used as a phase delay layer and may reinforce (i.e., supplement) a compensation function. The auxiliary layer 140 may include, for example, an isotropic liquid crystal layer. The auxiliary layer 140 may include, for example, homeotropic liquid crystals.

For example, the auxiliary layer 140 may have a refractive index satisfying Relationship Equation 7.

$$n_z > n_x = n_y \qquad \text{Relationship Equation 7}$$

In Relationship Equation 7, $n_x$ is a refractive index in the slow axis of the auxiliary layer 140, $n_y$ is a refractive index in the fast axis of the auxiliary layer 140, and $n_z$ is a refractive index in a perpendicular direction with the $n_x$ and $n_y$.

For example, the auxiliary layer 140 may have an in-plane retardation in a range of $0 \text{ nm} \leq R_0 \leq 1$ nm, for example, in a range of $0 \text{ nm} \leq R_0 \leq 0.5$ nm within the range, and substantially 0.

For example, the auxiliary layer 140 may be a protective layer. The auxiliary layer 140 may protect the surface of the polarizing film 110 and simultaneously, prevent the dichroic dye 72 included in the polarizing film 110 from migrating toward another layer for example at a high temperature under high humidity.

The auxiliary layer 140 may be coated on the polarizing film 110 or the first liquid crystal layer 130.

Hereinafter, an optical film according to another embodiment is illustrated.

Figure 5:
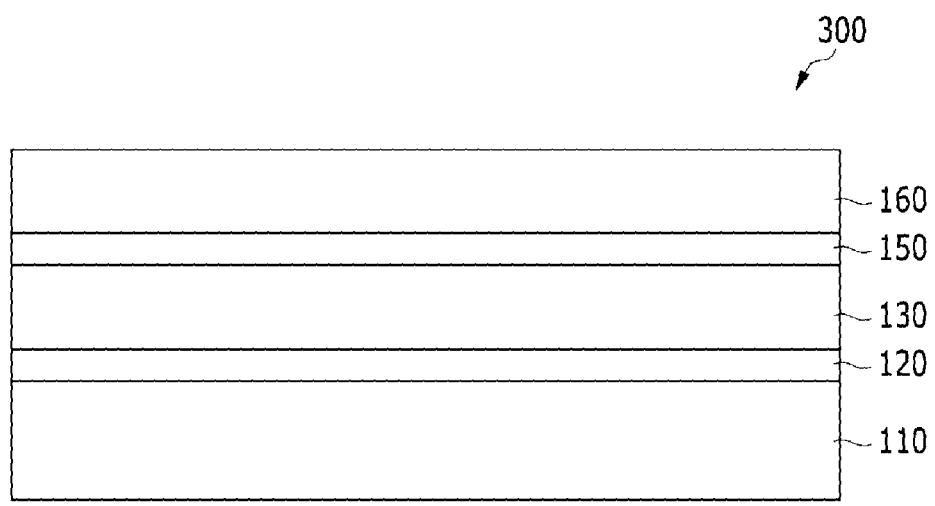
FIG. 5 is a schematic cross-sectional view showing an optical film according to another embodiment.

FIG. 5 is a schematic cross-sectional view showing an optical film according to another embodiment.

Referring to FIG. 5, the optical film 300 according to the embodiment includes the polarizing film 110, the first photo-alignment layer 120, and the first liquid crystal layer 130, like the above embodiment.

However, the optical film 300 according to the present embodiment further includes a second photo-alignment layer 150 and a second liquid crystal layer 160, unlike the above embodiment.

The second photo-alignment layer 150 is a thin film having an alignment in a predetermined direction by radiating light and may include, for example, a reaction product due to cross-linking, polymerization, and/or dimerization of a photoreactive compound. The photoreactive compound may have for example at least one photoreactive functional group and at least one cross-linking functional group. For example, the photoreactive compound may be a photo-dimerized compound.

The photoreactive functional group may be for example a cinnamate functional group represented by Chemical Formula D, a chalcone functional group represented by Chemical Formula E, or a coumarin functional group represented by Chemical Formula F, but is not limited thereto.

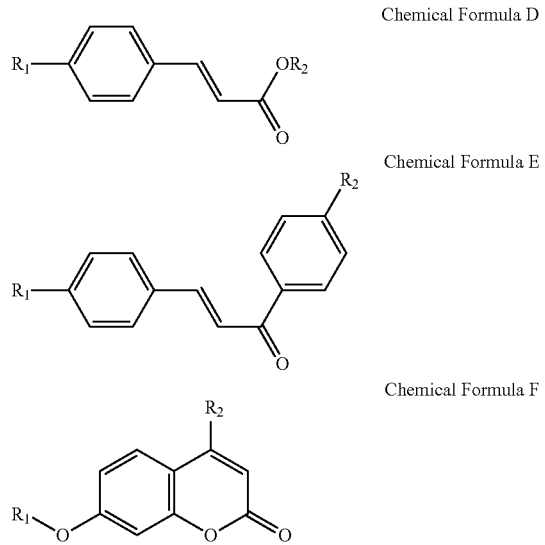

Chemical Formula D

Chemical Formula E

Chemical Formula F

In Chemical Formulae D to F, $R_1$ is a hydrogen atom, a halogen atom, a substituted or unsubstituted C1 to C3 alkyl group, a substituted or unsubstituted C1-C3 alkoxy group or cyano group, and $R_2$ is a substituted or unsubstituted phenyl group, a substituted or unsubstituted biphenyl group, a substituted or unsubstituted terphenyl group or a substituted or unsubstituted cyclohexyl group.

The second photo-alignment layer 150 may be coated directly on the first liquid crystal layer 130, and accordingly, the first liquid crystal layer 130 and the second photo-alignment layer 150 may be adjacent to each other without an intervening adhesive.

The second photo-alignment layer 150 may be formed by coating for example a solution for a photo-alignment layer including a photoreactive compound and a solvent on the first liquid crystal layer 130 and drying it.

The solvent may be selected from solvents dissolving the photoreactive compound, for example, toluene, cyclohexanone, cyclopentanone, n-butyl acetate, or propylene glycol methyl ether and also, a mixed solvent of more than two selected therefrom. In addition, the solvent may include any solvent capable of effectively dissolving each component to obtain a solution coated on a substrate.

The second photo-alignment layer 150 may give a pretilt angle to liquid crystals of the second liquid crystal layer 160 which is described later and may align the liquid crystals in a predetermined direction. For example, the reaction product of the photoreactive compound of the second photo-alignment layer 150 may be aligned in a predetermined direction with regard to the surface of the first liquid crystal layer 130 and the liquid crystals of the second liquid crystal layer 160 may be aligned according to the aligned direction of the reaction product of the photoreactive compound of the second photo-alignment layer 150. Herein, the predetermined direction may be greater than 0° and less than 180° with regard to the surface of the first liquid crystal layer 130. For example, when the polarized ultraviolet radiation (UV) is used to give an alignment property to the second photo-alignment layer 150, the predetermined direction may be a substantially horizontal direction or a substantially vertical direction with regard to the radiated polarization direction.

The second photo-alignment layer 150 may be less than or equal to about 500 nm thick, for example, about 5 nm to about 300 nm thick within the range, and specifically, about 10 nm to about 200 nm thick within the range.

The second liquid crystal layer 160 may include at least one kind of liquid crystal.

The liquid crystal may have a shape such as a rigid rod spread in one direction or a wide disk, and may be, for example, a monomer, an oligomer, and/or a polymer. The liquid crystal may have for example a positive or negative birefringence. The liquid crystal may be aligned in one direction along the optical axis.

The liquid crystal may be a reactive mesogen liquid crystal and may have, for example, at least one reactive cross-linking group. The reactive mesogen liquid crystal may include at least one of, for example, a rod-shaped aromatic derivative having at least one reactive cross-linking group, propylene glycol 1-methyl, propylene glycol 2-acetate, and a compound represented by P1-A1-(Z1-A2)n-P2 (wherein P1 and P2 independently include acrylate, methacrylate, vinyl, vinyloxy, epoxy, or a combination thereof, A1 and A2 independently include 1,4-phenylene, naphthalene-2,6-diyl group, or a combination thereof, Z1 includes a single bond, —C(O)O—, —OC(O)—, —(O)CO—, or a combination thereof, and n is 0, 1, or 2), but is not limited thereto.

For example, the second liquid crystal layer 160 may be a phase delay layer.

For example, the first liquid crystal layer 130 and the second liquid crystal layer 160 may each be a phase delay layer.

For example, the first liquid crystal layer 130 and the second liquid crystal layer 160 may have a different retardation. For example, either one of the first liquid crystal layer 130 and the second liquid crystal layer 160 may have an in-plane retardation of about 230 nm to about 300 nm at a 550 nm wavelength, and the other one of the first liquid crystal layer 130 and the second liquid crystal layer 160 may have an in-plane retardation of about 110 nm to about 160 nm at a 550 nm wavelength. For example, either one of the first liquid crystal layer 130 and the second liquid crystal layer 160 may be a λ/2 phase delay layer, and the other one of the first liquid crystal layer 130 and the second liquid crystal layer 160 may be a λ/4 phase delay layer.

The first liquid crystal layer 130 and the second liquid crystal layer 160 may each be an anisotropic liquid crystal layer and independently have a positive or negative birefringence.

The first liquid crystal layer 130 and the second liquid crystal layer 160 may independently have for example a refractive index satisfying one of Relationship Equations 4 to 6.

$$n_x > n_y = n_z,$$ Relationship Equation 4

$$n_x < n_y = n_z,$$ Relationship Equation 5

$$n_x > n_z > n_y,$$ Relationship Equation 6

In Relationship Equations 4 to 6, $n_x$ is a refractive index in the slow axis of the first liquid crystal layer 130 and the second liquid crystal layer 160, $n_y$ is a refractive index in the fast axis of the first liquid crystal layer 130 and the second liquid crystal layer 160, and $n_z$ is a refractive index in a perpendicular direction to the $n_x$ and the $n_y$.

The second liquid crystal layer 160 may be coated on the second photo-alignment layer 150.

The second liquid crystal layer 160 may be less than or equal to about 10 μm thick. Within the range, the thickness may be in a range of about 1 μm to 10 μm.

The optical film 300 according to the present embodiment may include the polarizing film 110, the first photo-alignment layer 120, the first liquid crystal layer 130, the second photo-alignment layer 150, and the second liquid crystal layer 160 adjacent to each other through coating and thus have a self-integrated structure without a separate adhesive.

Hereinafter, an optical film according to another embodiment is illustrated.

Figure 6:
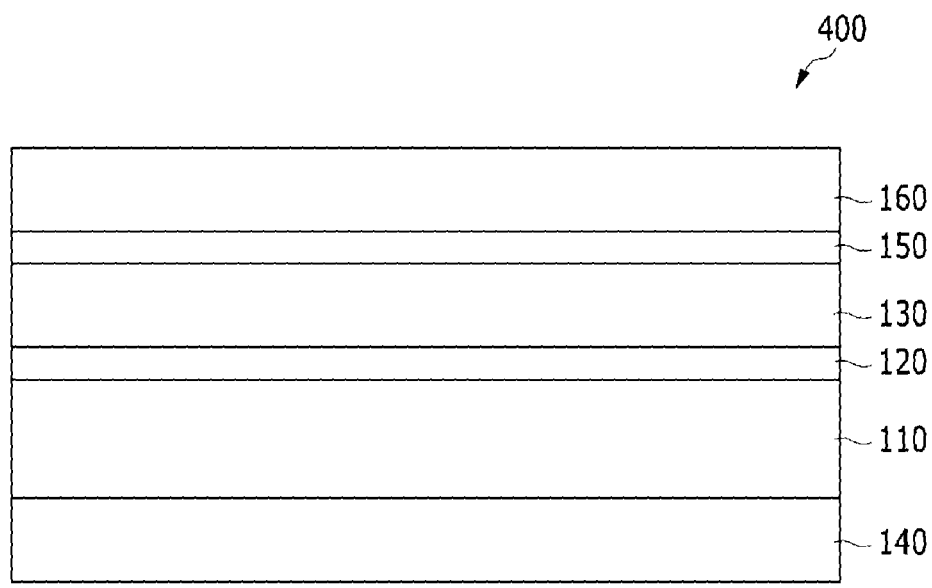
FIG. 6 is a schematic cross-sectional view showing an optical film according to another embodiment.

FIG. 6 is a schematic cross-sectional view of an optical film according to another embodiment.

Referring to FIG. 6, the optical film 400 according to the present embodiment includes the polarizing film 110, the first photo-alignment layer 120, the first liquid crystal layer 130, the second photo-alignment layer 150, and the second liquid crystal layer 160 as in the embodiment described in FIG. 5.

However, the optical film 400 according to the embodiment further includes the auxiliary layer 140 unlike the above embodiment. In the drawing, the auxiliary layer 140 is positioned on one side of the polarizing film 110 for better understanding and ease of description but is not limited thereto and may be positioned on one side of the second liquid crystal layer 160.

For example, the auxiliary layer 140 may be combined with the first liquid crystal layer 130 and the second liquid crystal layer 160 used as a phase delay layer and thus reinforce a compensation function. The auxiliary layer 140 may include for example an isotropic liquid crystal layer. The auxiliary layer 140 may include for example a homeotropic liquid crystal.

For example, the auxiliary layer 140 may have a refractive index satisfying Relationship Equation 7.

$$n_z > n_x = n_y$$ Relationship Equation 7

In the relationship equation 7, $n_x$ is a refractive index in the slow axis of the auxiliary layer 140, $n_y$ is a refractive index in the fast axis of the auxiliary layer 140, and $n_z$ is a refractive index in a perpendicular direction to the $n_x$ and the $n_y$.

For example, the in-plane retardation of the auxiliary layer 140 may be in a range of 0 nm≤$R_0$≤1 nm, for example, 0 nm≤$R_0$≤0.5 nm within the range, and substantially, 0.

For example, the auxiliary layer 140 may be a protective layer. The auxiliary layer 140 may protect the surface of the polarizing film 110 and simultaneously, prevent the dichroic dye 72 included in the film 110 from migrating toward another layer for example at a high temperature under high humidity.

The auxiliary layer 140 may be coated on the polarizing film 110 or the second liquid crystal layer 160.

Hereinafter, a method of manufacturing the above optical film according to one embodiment is illustrated.

The method of manufacturing the above optical film according to one embodiment includes preparing the polarizing film 110, forming the first photo-alignment layer 120, and forming the first liquid crystal layer 130.

The preparation of the polarizing film 110 may include melt-blending a composition including the polyolefin 71 and the dichroic dye 72, putting the composition in a mold, pressing it to shape it into a sheet, and elongating the sheet in a uniaxial direction.

The polyolefin 71 and the dichroic dye 72 may each be included as a solid such as powder and melt-blended at a temperature greater than or equal to the melting point (Tm) of the polyolefin 71, and elongated, manufacturing the polarizing film 110.

The melt-blending may be for example performed at less than or equal to about 300° C. and specifically, in a range of about 130° C. to about 300° C. The sheet-shaping may be performed by putting a melt-blend in the mold, pressing it with a press, or discharging it through a T-die into a chill roll. The elongation in a uniaxial direction may be performed at about 25° C. to about 200° C. at a rate of about 400% to about 1000%. Herein, the elongation rate indicates a ratio of a sheet length before the elongation and a sheet length after the elongation, that is, an elongation degree of the sheet in a uniaxial direction.

The formation of the first photo-alignment layer 120 includes preparing a solution including a photoreactive compound and a solvent, coating the solution on the polarizing film 110, drying it, and radiating light thereinto.

The photoreactive compound may have for example at least one photoreactive functional group and at least one cross-linkable functional group. For example, the photoreactive compound may be a photo-dimerized compound. For example, the photoreactive compound may be a photodimerization compound having a cinnamoyl group.

The solvent may be selected from solvents capable of being directly coated on the polarizing film 110 as described above, for example, from solvents satisfying the solubility parameters of Relationship Equations 1 to 3.

For example, polyolefin may include polypropylene, and the solvent may include propylene glycol monomethyl ether, a mixed solvent of propylene glycol monomethyl ether and toluene, a mixed solvent of propylene glycol monomethyl ether and cyclohexanone, but is not limited thereto.

The coating of the solution on the polarizing film 110 may include, for example, spin coating, slit coating, dip coating, inkjet coating, and the like, but is not limited thereto.

The drying may be for example performed at about 100° C. and specifically, from about 25° C. to about 100° C.

The light radiation may be for example performed by using UV, for example a polarized UV, but is not limited thereto. For example, when the polarized UV is used to give an alignment property to the first photo-alignment layer 120, the reactive product of the photoreactive compound may be aligned to substantially horizontal direction or substantially vertical direction with regard to the radiated polarization direction.

The formation of the first liquid crystal layer 130 may include coating a liquid crystal solution including a liquid crystal and a solvent on the first photo-alignment layer 120, drying the liquid crystal solution, and curing it.

The coating of the liquid crystal solution may for example include spin coating, slit coating, dip coating, inkjet coating, and the like but is not limited thereto.

The drying of the liquid crystal solution may be for example performed at less than or equal to about 100° C. and specifically, at about 25° C. to about 100° C.

The curing may include photo curing and/or thermal curing and may be, for example, performed by radiating UV but is not limited thereto.

According to the above embodiment, the formation of the auxiliary layer 140 may be further included.

The auxiliary layer 140 may include coating a liquid crystal solution including a liquid crystal and a solvent on the polarizing film 110 or the first liquid crystal layer 130, drying the liquid crystal solution, and curing it.

The coating of the liquid crystal solution may for example include spin coating, slit coating, dip coating, inkjet coating, and the like but is not limited thereto.

The drying of the liquid crystal solution may be for example performed at about 100° C. and specifically, from about 25° C. to about 100° C.

The curing may include photo curing and/or thermal curing and may be for example performed by radiating UV, but is not limited thereto.

According to the above embodiment, the second photo-alignment layer 150 and the second liquid crystal layer 160 may be further included in the optical film. The formation of the second photo-alignment layer 150 and the second liquid crystal layer 160 may be the same as that of the first photo-alignment layer 120 and the first liquid crystal layer 130.

According to the above embodiment, the second photo-alignment layer 150, the second liquid crystal layer 160, and the auxiliary layer 140 may be further included in the optical film.

The optical films 100, 200, 300, and 400 may be applied to various display devices. Particularly, the optical films 100, 200, 300, and 400 have a thin thickness as described above and may be effectively applied to a flexible display device such as a foldable display device or a bendable display device.

A display device according to an embodiment includes a display panel and an optical film positioned on the display panel. The display panel may be a liquid crystal panel or an organic light emitting display panel, but is not limited thereto.

Hereinafter, an organic light emitting display is described as one example of a display device.

Figure 7:
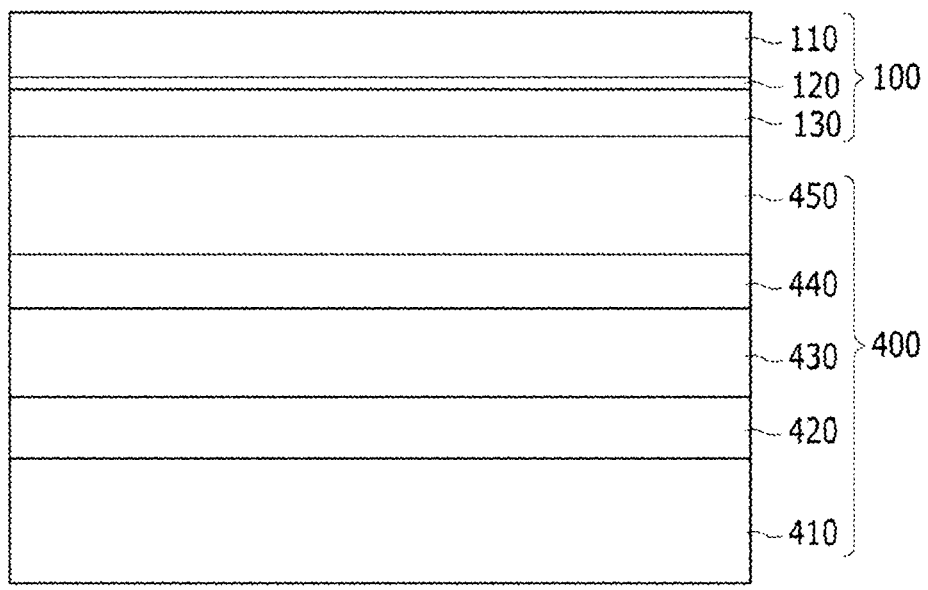
FIG. 7 is a schematic cross-sectional view showing an organic light emitting display according to one embodiment.

FIG. 7 is a cross-sectional view showing an organic light emitting display according to one embodiment.

Referring to FIG. 5, the organic light emitting display according to one embodiment includes an organic light emitting display panel 400 and an optical film 100 positioned on one side of the organic light emitting display panel 400.

The organic light emitting display panel 400 may include a base substrate 410, a lower electrode 420, an organic emission layer 430, an upper electrode 440, and an encapsulation substrate 450.

The base substrate 410 may be made of glass or plastic.

At least one of the lower electrode 420 and the upper electrode 440 may be an anode, and the other one may be a cathode. The anode is an electrode injected with holes, and may be made of a transparent conductive material having a high work function to transmit the emitted light to the outside, for example, ITO or IZO. The cathode is an electrode injected with electrons, and may be made of a conductive material having a low work function and not affecting the organic material, and may be selected from, for example, aluminum (Al), calcium (Ca), and barium (Ba).

The organic emission layer 430 includes an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer is used to balance electrons and holes, and may include a hole transport layer, a hole injection layer (HIL), an electron injection layer (EIL), and an electron transporting layer.

The encapsulation substrate 450 may be made of glass, metal, or a polymer, and may seal the lower electrode 420, the organic emission layer 430, and the upper electrode 440 to prevent moisture and/or oxygen inflow from the outside.

The optical film 100 may be disposed on the light-emitting side. For example, in the case of a bottom emission structure emitting light at the side of the base substrate 410, the optical film 100 may be disposed on the exterior side of the base substrate 410, while on the other hand, in the case of a top emission structure emitting light at the side of the encapsulation substrate 450, the optical film 100 may be disposed on the exterior side of the encapsulation substrate 450.

The optical film 100 has a self-integrated structure that the polarizing film 110, the first photo-alignment layer 120, and the first liquid crystal layer 130 are adjacent to each other through coating as described above and thus may prevent light passing the polarizing film 110 from being reflected by a metal such as an electrode and the like in the organic light emitting display panel 400 and leaking out of the display device and thus visibility deterioration by the light inflowing from outside. Accordingly, display characteristics of the organic light emitting display may be improved.

Herein, the optical film 100 is shown for better understanding and ease of description but the above optical films 200, 300, and 400 may be applied the same as the optical film 100.

Hereinafter, a liquid crystal display (LCD) is described as one example of the display device.

Figure 8:
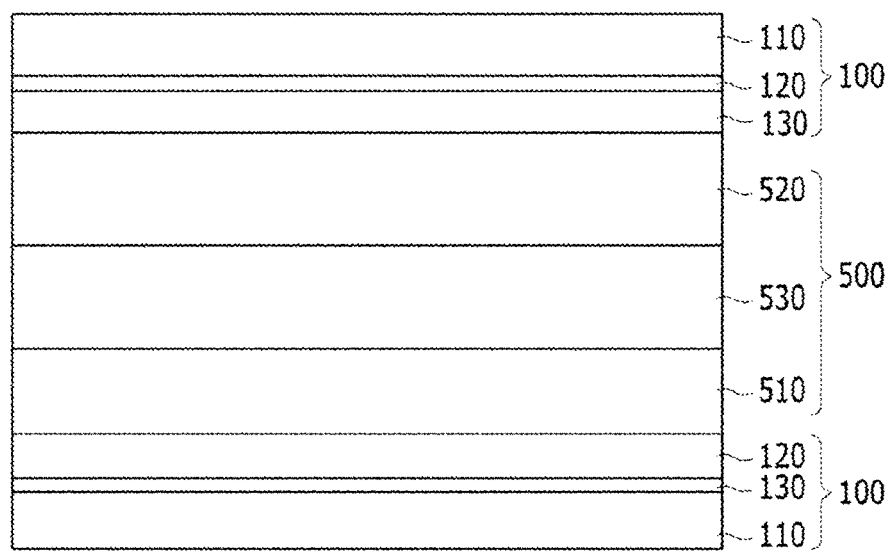
FIG. 8 is a schematic cross-sectional view of a liquid crystal display (LCD) device according to one embodiment.

FIG. 8 is a cross-sectional view schematically showing a liquid crystal display according to one embodiment.

Referring to FIG. 8, the liquid crystal display (LCD) according to one embodiment includes a liquid crystal display panel 500, and an optical film 100 positioned on one side of the liquid crystal panel 500.

The liquid crystal panel 500 may be a twist nematic (TN) mode panel, a vertical alignment (PVA) mode panel, an in-plane switching (IPS) mode panel, an optically compensated bend (OCB) mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same, and the second display panel 520 may include, for example, a color filter (not shown) formed on a substrate (not shown) and a second electric field generating electrode (not shown). However, it is not limited thereto, and the color filter may be included in the first display panel 510, while the first electric field generating electrode and the second electric field generating electrode may be disposed on the first display panel 510 together therewith.

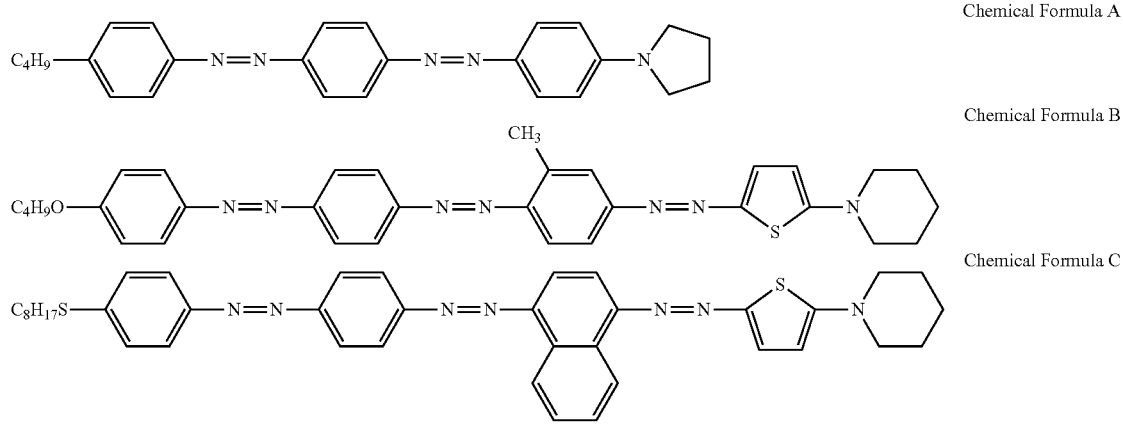

Chemical Formula A

Chemical Formula B

Chemical Formula C

The liquid crystal layer 530 may include a plurality of liquid crystal molecules. The liquid crystal molecules may have positive or negative dielectric anisotropy. In the case of the liquid crystal molecules having positive dielectric anisotropy, the major axes thereof may be aligned substantially parallel to the surface of the first display panel 510 and the second display panel 520 when not applying an electric field, and the major axes may be aligned substantially perpendicular to the surface of the first display panel 510 and second display panel 520 when applying an electric field. On the other hand, in the case of the liquid crystal molecules having negative dielectric anisotropy, the major axes may be aligned substantially perpendicular to the surface of the first display panel 510 and the second display panel 520 when not applying an electric field, and the major axes may be aligned substantially parallel to the surface of the first display panel 510 and the second display panel 520 when applying an electric field.

The optical film 100 may be disposed on the outside of the liquid crystal panel 500. Although the optical film 100 is shown to be provided on both the lower part and the upper part of the liquid crystal panel 500 in the drawing, it is not limited thereto, and it may be formed on only one of the lower part and the upper part of the liquid crystal panel 500.

The optical film 100 includes the polarization film 110 that is self-integrated and formed from a melt blend of a polymer resin and a dichroic dye, and the phase delay layer 120 that is a one- or two-layered liquid crystal anisotropic layer as described above, and is the same as described above.

Herein, the optical film 100 is shown for better understanding and ease of description but the above optical films 200, 300, and 400 may be applied the same as the optical film 100.

Hereinafter, the present disclosure is illustrated in more detail with reference to examples. However, these examples are exemplary, and the present disclosure is not limited thereto.

Manufacture of Polarizing Film

Preparation Example 1

Each dichroic dye represented by Chemical Formulae A, B, and C is respectively mixed in an amount of 0.5, 0.2, and 0.3 parts by weight based on 100 parts by weight of polypropylene (HU300, Hanwha Total Petrochemical Co., Ltd.), preparing each composition for a polarization film.

Each composition for a polarization film is melt-blended at about 250° C. by using a Micro-compounder made by DSM. The melt blend is put in a sheet-shaped mold and pressed with a high pressure at a high temperature, manufacturing a film. Subsequently, the film is 1000% elongated in a uniaxial direction (a tensile tester, Instron) at 115° C., manufacturing a 20 um-thick polarizing film.

The solubility parameters, contact angle, and surface energy of the polarizing film are provided in Table 1.

TABLE 1

| Hansen Solubility Parameter | | | Contact angle (°) | | Surface Energy |
|---|---|---|---|---|---|
| $H_D$ | $H_P$ | $H_H$ | $\theta_W$ | $\theta_D$ | (mJ/m$^2$) |
| 17.6 | 2.8 | 0.3 | 95.7 | 48.4 | 38.2 |

Comparative Preparation Example 1

A polyvinyl alcohol (PVA) film (PS 60, Kuraray) is elongated to be 30 μm, preparing an elongated PVA film. Subsequently, 40 μm-thick TAC films (Fuji Film Co.) are adhered to both sides of the elongated PVA film, manufacturing a TAC/PVA/TAC polarizer.

Composition for Photo-Alignment Layer

Preparation Examples 2 to 9 and Comparative Preparation Examples 2 and 3

A composition for a photo-alignment layer is prepared by mixing 3 wt % of a photodimerization-type photoalignment polymer having a cinnamoyl group (Nissan Chemical Industries, LTD.) and 97 wt % of a solvent.

The solubility parameter of the solvents used in Preparation Examples 2 to 9 and Comparative Preparation Examples 2 and 3 is provided in Table 2.

TABLE 2

| | $H_D$ | $H_P$ | $H_H$ |
|---|---|---|---|
| Preparation Examples 2, 3, 7, 8, 9 | 16.1 | 6.1 | 6.6 |
| Preparation Examples 4, 5 | 16.7 | 4.7 | 5.2 |

TABLE 2-continued

|  | $H_D$ | $H_P$ | $H_H$ |
|---|---|---|---|
| Preparation Example 6 | 16.3 | 6.9 | 11.1 |
| Comparative Preparation Example 2 | 17.9 | 11.9 | 5.2 |
| Comparative Preparation Example 3 | 15.8 | 4.4 | 7.8 |

Manufacture of Optical Film

Example 1

The composition for a photo-alignment layer according to Preparation Example 2 is bar-coated on the polarizing film according to Preparation Example 1 and dried at 70° C. The coated composition is UV-radiated with a light dose of 30 megaWatts per square centimeter (mW/cm²) for 5 seconds, forming a photo-alignment layer. Subsequently, a liquid crystal A (UCL-017, DIC Co.) is coated on the photo-alignment layer and dried at 70° C. to form a liquid crystal layer, manufacturing an optical film.

Example 2

An optical film is manufactured according to the same method as Example 1 except for using a liquid crystal B (RMS03-0130, Merck & Co., Inc.) instead of the liquid crystal A.

Example 3

An optical film is manufactured according to the same method as Example 1 except for using the composition for a photo-alignment layer according to Preparation Example 3 instead of the composition for a photo-alignment layer according to Preparation Example 2.

Example 4

An optical film is manufactured according to the same method as Example 1 except for using the composition for a photo-alignment layer according to Preparation Example 3 instead of the composition for a photo-alignment layer according to Preparation Example 2 and liquid crystal B (RMS03-013C, Merck & Co., Inc.) instead of the liquid crystal A.

Example 5

An optical film is manufactured according to the same method as Example 1 except for using the composition for a photo-alignment layer according to Preparation Example 4 instead of the composition for a photo-alignment layer according to Preparation Example 2 and drying it at 100° C.

Example 6

The composition for a photo-alignment layer according to Preparation Example 2 is bar-coated on the polarizing film according to Preparation Example 1 and dried at 70° C. Subsequently, the coated composition is UV-radiated with a light dose of 30 mW/cm² for 5 seconds, forming a lower photo-alignment layer. Subsequently, a liquid crystal A (UCL-017, DIC Corporation) is coated on the lower photo-alignment layer and dried at 70° C., forming a lower liquid crystal layer. On the lower liquid crystal layer, an upper photo-alignment layer is formed in the same method as used for the lower photo-alignment layer, and then, an upper liquid crystal layer is formed by coating a liquid crystal solution (UCL-017, DIC Co.) and drying it at 70° C., manufacturing an optical film.

Example 7

An optical film is manufactured according to the same method as Example 1 except for further forming an auxiliary layer by coating a liquid crystal C (UCL-018, DIC Co.) on the polarizing film according to Preparation Example 1 and drying it at 70° C.

Example 8

An optical film is manufactured according to the same method as Example 6 except for further forming an auxiliary layer by coating a liquid crystal C (UCL-018, DIC Co.) on the polarizing film according to Preparation Example 1 and drying it at 70° C.

Comparative Example 1

An optical film is manufactured by binding the polarizer according to Comparative Preparation Example 1 with a polycarbonate λ/4 phase delay layer (WRS, Teijin) with an adhesive (PS-47, Soken Chemical & Engineering Co., Ltd.).

Comparative Example 2

An optical film is manufactured according to the same method as Example 1 except for using the composition for a photo-alignment layer according to Comparative Preparation Example 2 instead of the composition for a photo-alignment layer according to Preparation Example 2 and drying it at 100° C.

Comparative Example 3

An optical film is manufactured according to the same method as Example 1 except for using the composition for a photo-alignment layer according to Comparative Preparation Example 3 instead of the composition for a photo-alignment layer according to Preparation Example 2 and drying it at 110° C.

Evaluations

Evaluation 1

Each solubility parameter difference of the polarizing film according to Preparation Example 1 with a solvent used in Preparation Examples 2 to 9 and Comparative Preparation Examples 2 and 3 is provided in Table 3.

TABLE 3

|  | $H_D$ | $H_P$ | $H_H$ |
|---|---|---|---|
| polarizing film (PP) | 17.6 | 2.8 | 0.3 |
|  | $\Delta H_D$ | $\Delta H_P$ | $\Delta H_H$ |
| Preparation Example 2, 3, 7, 8, 9 | 1.5 | 3.3 | 6.3 |
| Preparation Example 4, 5 | 0.9 | 1.9 | 4.9 |
| Preparation Example 6 | 1.3 | 4.1 | 10.8 |
| Comparative Preparation Example 2 | 0.3 | 9.1 | 4.9 |
| Comparative Preparation Example 3 | 1.8 | 1.6 | 7.5 |

$\Delta H_D = | H_D(PP) - H_D(\text{Solvent}) |$
$\Delta H_P = | H_P(PP) - H_P(\text{Solvent}) |$
$\Delta H_H = | H_H(PP) - H_H(\text{Solvent}) |$ Evaluation 2: Thickness Thicknesses of the optical films according to Examples 1 to 8 are compared with the optical films according to Comparative Examples 1 to 3.

The results are provided in Table 4.

TABLE 4

|  | Thickness (μm) |
| --- | --- |
| Example 1 | 27 |
| Example 2 | 27 |
| Example 3 | 27 |
| Example 4 | 27 |
| Example 5 | 27 |
| Example 6 | 29 |
| Example 7 | 30 |
| Example 8 | 31 |
| Comparative Example 1 | 167 |

Referring to Table 4, the optical films according to Examples 1 to 8 have a thickness of less than or equal to about 50 μm and are much thinner than the optical film according to Comparative Example 1.

Evaluation 3: Coating Property

In the optical films according to Examples 1 to 8 and Comparative Examples 2 and 3, the coating property of a (lower) photo-alignment layer and the alignment property of a photo-alignment layer on a polarizing film are evaluated.

The coating property is evaluated with a polarizing microscope (Olympus, USA), and the alignment property is evaluated by KOBRA-WPR (Oji Scientific Instruments, Japan).

The results are provided in Table 5.

TABLE 5

|  | Coating property | Alignment property |
| --- | --- | --- |
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Example 7 | ○ | ○ |
| Example 8 | ○ | ○ |
| Comparative Example 2 | X | X |
| Comparative Example 3 | X | X |

○: Satisfactory
X: Dewetting, Hazy & Pin hole

Referring to Table 5, the optical films according to Examples 1 to 8 show satisfactory coating and alignment properties.

Evaluation 4: Bending Property

The bending property of the optical films according to Examples 1 to 8 and Comparative Examples 2 and 3 is evaluated.

A bending test is performed as a static bending test by folding each optical film according to Examples 1 to 5 and Comparative Examples 1 to 3 to have a curvature radius (r) of 1 mm and fixing it between two stainless steel plates and then, allowing it to stand at room temperature for 240 hours, unfolding it, and examining it to see whether a crack and a wrinkle are generated at the folded place.

The results are provided in Table 6.

TABLE 6

|  | Appearance damage at a folded place |
| --- | --- |
| Example 1 | X |
| Example 2 | X |
| Example 3 | X |
| Example 4 | X |
| Example 5 | X |
| Example 6 | X |
| Example 7 | X |
| Example 8 | X |
| Comparative Example 1 | ⊙ |

X: no appearance damage
⊙: a large amount of wrinkling and/or cracking

Referring to Table 6, the optical films according to Examples 1 to 8 show no appearance change when folded to have a curvature radius (r) of 1 mm when folded and thus may be effectively applied to a foldable and/or bendable display device. On the contrary, the optical film according to Comparative Example 1 shows a large amount of wrinkling and/or cracking.

Evaluation 5: Stability of Optical Properties

Stability of optical properties of the optical film according to Example 1 is evaluated.

The stability evaluation of optical properties of an optical film is performed to check if a liquid crystal layer works as a protective layer for a polarizing film and thus evaluated by comparing change degrees of optical properties of the polarizing film at a high temperature. The Reference Example is a polarizing film having no liquid crystal layer according to Preparation Example 1.

The stability of optical properties is evaluated by measuring light transmittance and degree of polarization of an optical film and then, allowing the optical film to stand at 85° C. for 500 hours and remeasuring its light transmittance and degree of polarization.

The light transmittance is evaluated by using a UV/Vis spectrophotometer (V-7100, JASCO Inc.).

The light transmittance is used to obtain polarization efficiency (PE).

The polarization efficiency is obtained through Equation 1.

$$PE(\%)=[(T_{//}-T_{\perp})/(T_{//}+T_{\perp})]^{1/2}\llcorner 100 \qquad \text{Equation 1}$$

In Equation 1,

PE denotes polarization efficiency, $T_{//}$ is transmittance of light entering parallel to the transmissive axis of a polarizing film, and $T_{\perp}$ is transmittance of light entering perpendicular to the transmissive axis of the polarizing film.

The results are provided in Tables 7 to 10.

TABLE 7

|  | $\lambda_{max}$ (380-780 nm) | light transmittance (%) change (ΔTS) |
| --- | --- | --- |
| Example 1 | 450 | 4.2 |
| Reference Example | 450 | 14.5 |

TABLE 8

| | $\lambda_{max}$ (380-780 nm) | light transmittance (%) change ($\Delta$TS) |
|---|---|---|
| Example 1 | 550 | 1.3 |
| Reference Example | 550 | 5.5 |

TABLE 9

| | $\lambda_{max}$ (380-780 nm) | polarization efficiency ($\Delta$PE) |
|---|---|---|
| Example 1 | 450 | 2.8 |
| Reference Example | 450 | 21.4 |

TABLE 10

| | $\lambda_{max}$ (380-780 nm) | Polarization efficiency ($\Delta$PE) |
|---|---|---|
| Example 1 | 550 | 1.5 |
| Reference Example 1 | 550 | 2.2 |

Referring to Tables 7 to 10, the optical film according to Example 1 shows a very small decrease in terms of light transmittance and polarization efficiency compared with a polarizing film (Reference Example) after being allowed to stand for a long time at a high temperature. The reason is that the liquid crystal layer of the optical film is used as a protective layer for a polarizing film and thus prevents a dichroic dye of the polarizing film from migrating out and resultantly improves optical properties of the optical film.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing an optical film, the method comprising preparing a polarizing film from a melt-blend of a polyolefin and a dichroic dye, coating a solution for a photo-alignment layer comprising a photoreactive compound and a solvent on a side of the polarizing film to prepare a coated solution, drying the coated solution for a photo-alignment layer to provide a first photo-alignment layer, and forming a first liquid crystal layer on a side of the first photo-alignment layer, wherein solubility parameters of the polyolefin and the solvent satisfy Relationship Equations 1 to 3:

$0.9 \leq |H_D(P) - H_D(S)| \leq 1.7$,  Relationship Equation 1

$1.9 \leq |H_P(P) - H_P(S)| \leq 4.1$,  Relationship Equation 2

$4.9 \leq |H_H(P) - H_H(S)| \leq 10.8$.  Relationship Equation 3 wherein, in Relationship Equations 1 to 3, $H_D(P)$ is a Hansen solubility parameter for a repulsive force or a dispersion of the polyolefin, $H_D(S)$ is a Hansen solubility parameter for a repulsive force or a dispersion of the solvent, $H_P(P)$ is a Hansen solubility parameter for a polarity of the polyolefin, $H_P(S)$ is a Hansen solubility parameter for a polarity of the solvent, $H_H(P)$ is a Hansen solubility parameter for a hydrogen bond of the polyolefin, and $H_H(S)$ indicates a Hansen solubility parameter for a hydrogen bond of the solvent.

2. The method of claim 1, wherein the photoreactive compound comprises a photo-dimerized compound.

3. The method of claim 1, wherein the polyolefin comprises polypropylene, and the solvent comprises propylene glycol monomethyl ether, a mixed solvent of propylene glycol monomethyl ether and toluene, or a mixed solvent of propylene glycol monomethyl ether and cyclohexanone.

4. The method of claim 1, further comprising forming a second photo-alignment layer on a side of the first liquid crystal layer, and forming a second liquid crystal layer on a side of the second photo-alignment layer.

5. The method of claim 1, further comprising forming an auxiliary layer on a side of the polarizing film opposite the side adjacent to the first photo alignment layer or on a side of the first liquid crystal layer.

* * * * *